(12) United States Patent
Blumberg et al.

(10) Patent No.: US 8,402,550 B2
(45) Date of Patent: Mar. 19, 2013

(54) METHOD AND DEVICE FOR PREVENTING A CONTROL ERROR OF A MACHINE TOOL

(75) Inventors: Manfred Blumberg, Wipperfürth (DE); Stefan Dirrichs, Wermelskirchen (DE); Wolfgang London, Hückeswagen (DE); Gary Töpfer, Remscheid (DE)

(73) Assignee: Trinary Anlagenbau GmbH, Monchengladbach (DE)

( * ) Notice: Subject to any disclaimer, the term of this patent is extended or adjusted under 35 U.S.C. 154(b) by 1324 days.

(21) Appl. No.: 10/575,524

(22) PCT Filed: Oct. 17, 2003

(86) PCT No.: PCT/EP03/11569
§ 371 (c)(1),
(2), (4) Date: Apr. 12, 2006

(87) PCT Pub. No.: WO2005/047993
PCT Pub. Date: May 26, 2005

(65) Prior Publication Data
US 2007/0136818 A1    Jun. 14, 2007

(51) Int. Cl.
*G06F 17/30* (2006.01)
(52) U.S. Cl. ............... 726/27; 726/26; 726/28; 726/29; 713/182
(58) Field of Classification Search ............. 726/27
See application file for complete search history.

(56) References Cited

U.S. PATENT DOCUMENTS
4,329,096 A    5/1982    Herscovici
(Continued)

FOREIGN PATENT DOCUMENTS
CN    87106651 A    4/1988
DE    43 42 648 A1    6/1995
(Continued)

OTHER PUBLICATIONS

Edgar et al., "Automatic Control in Microelectronics manufacturing: Practices, Challenges, and Possibilities," Automatica, 2000, pp. 1568-1598.*

(Continued)

*Primary Examiner* — Luu Pham
(74) *Attorney, Agent, or Firm* — McCormick, Paulding & Huber LLP

(57) ABSTRACT

Machine tool (2, 2a) protected against improper activation, which has an open-loop and/or closed-loop control device for the activation of machine functions, preferably machine axes, and means for reading in machine control parameters for the open-loop and/or closed-loop control device from a data carrier or electronic carrier signal (3), and which has an improper-activation safety module, preferably an improper-activation safety software module, which decodes the machine control parameters that are intended for the machine tool and are encoded by means of an asymmetric encryption method, using an encryption key which is assigned to the machine tool (2, 2a) and provided for the encryption, with the aid of a decryption key which is likewise assigned to the machine tool (2, 2a), is different from the encryption key and is provided for the decryption, and which module enables the machine control parameters for controlling the machine tool (2, 2a) only in the case of successful decryption, with an associated method of avoiding improper machine activation by machine control parameters, and also an associated data carrier or data carrier signal and a method, system and program for generating such parameters.

3 Claims, 1 Drawing Sheet

U.S. PATENT DOCUMENTS

| | | | |
|---|---|---|---|
| 4,405,829 A * | 9/1983 | Rivest et al. | 380/30 |
| 4,672,549 A | 6/1987 | Saxton | |
| 4,761,891 A | 8/1988 | Sugimura | |
| 4,981,402 A * | 1/1991 | Krenzer et al. | 409/26 |
| 5,175,962 A | 1/1993 | Pedersen | |
| 5,573,449 A | 11/1996 | Mackowsky | |
| 5,604,677 A | 2/1997 | Brien | |
| 5,715,429 A | 2/1998 | Takizawa et al. | |
| 5,844,191 A | 12/1998 | Cox | |
| 5,859,515 A | 1/1999 | Takizawa et al. | |
| 5,868,051 A | 2/1999 | Pakos | |
| 5,911,924 A | 6/1999 | Siegrist et al. | |
| 5,930,142 A | 7/1999 | Schleicher et al. | |
| 6,067,575 A * | 5/2000 | McManis et al. | 719/313 |
| 6,217,409 B1 | 4/2001 | Stadtfeld et al. | |
| 6,249,102 B1 | 6/2001 | Brakelmann et al. | |
| 6,489,741 B1 | 12/2002 | Genov et al. | |
| 6,671,569 B1 | 12/2003 | Schoop et al. | |
| 6,687,566 B2 | 2/2004 | Nishimoto et al. | |
| 6,704,872 B1 | 3/2004 | Okada | |
| 6,755,748 B2 | 6/2004 | Brooks | |
| 6,858,814 B2 | 2/2005 | Fischer et al. | |
| 6,868,304 B2 | 3/2005 | Uehara et al. | |
| 6,985,793 B2 | 1/2006 | Landers et al. | |
| 7,003,373 B2 | 2/2006 | Baumann et al. | |
| 7,012,395 B2 | 3/2006 | Haunerdinger et al. | |
| 7,030,586 B2 | 4/2006 | Cazzavillan et al. | |
| 7,121,460 B1 * | 10/2006 | Parsons et al. | 235/379 |
| 7,133,845 B1 * | 11/2006 | Ginter et al. | 705/51 |
| 7,383,882 B2 * | 6/2008 | Lerche et al. | 166/250.01 |
| 7,643,639 B2 | 1/2010 | Kaszkin et al. | |
| 2001/0020228 A1 * | 9/2001 | Cantu et al. | 705/1 |
| 2002/0023223 A1 | 2/2002 | Schmidt et al. | |
| 2003/0023336 A1 * | 1/2003 | Kreidler et al. | 700/108 |
| 2003/0023435 A1 * | 1/2003 | Josephson | 704/235 |
| 2003/0105963 A1 * | 6/2003 | Slick et al. | 713/171 |
| 2003/0163431 A1 * | 8/2003 | Ginter et al. | 705/64 |
| 2004/0164698 A1 | 8/2004 | Cazzavillan et al. | |
| 2006/0156025 A1 * | 7/2006 | Shibui et al. | 713/183 |
| 2006/0206397 A1 * | 9/2006 | Shear et al. | 705/28 |
| 2006/0208577 A1 * | 9/2006 | Richter et al. | 307/326 |
| 2006/0212370 A1 * | 9/2006 | Shear et al. | 705/28 |

FOREIGN PATENT DOCUMENTS

| | | |
|---|---|---|
| DE | 19545083 A1 | 6/1997 |
| DE | 692 27 215 T2 | 6/1999 |
| DE | 197 81 968 T1 | 11/1999 |
| DE | 199 35 329 A1 | 2/2001 |
| DE | 19935320 A1 | 2/2001 |
| DE | 101 25 383 A1 | 6/2002 |
| DE | 101 24 800 A1 | 12/2002 |
| EP | 0 067 875 | 12/1982 |
| EP | 0261947 A1 | 3/1988 |
| EP | 0522590 A1 | 1/1993 |
| EP | 0 709 157 A2 | 5/1996 |
| EP | 0784525 B1 | 7/1997 |
| JP | 57-111792 A | 7/1982 |
| JP | 62150438 A | 7/1987 |
| JP | 07-129207 A | 5/1995 |
| JP | 11345117 A | 12/1999 |
| JP | 2000-076063 A | 3/2000 |
| JP | 2001255953 A | 9/2001 |
| JP | 2003015713 A | 1/2003 |
| JP | 2003044109 A | 2/2003 |
| WO | WO 98/09203 | 3/1998 |
| WO | 02063824 A1 | 8/2002 |
| WO | WO 02/063824 A1 | 8/2002 |
| WO | WO 02/095506 A2 | 11/2002 |
| WO | 03005135 A2 | 1/2003 |

OTHER PUBLICATIONS

Erol et al., "Open System Architecture Modular Tool Kit for Motion and Machining Process Control," IEEE, Sep. 2000, pp. 281-291.*

Klingelnberg-Oerlikon brochure "SIGMA OPAL, Formschleifen von Großverzahnungen", pp. 1-20.

Klingelnberg brochure "SNC 31, Werkzeug-Scharfschleifmaschine", pp. 1-20.

Klingelnberg brochure "HNC 35, Vollautomatische Schnecken-und Gewindeschleifmaschine", pp. 1-14.

Presentation of Dr. Harmuth Müller of Klingelnberg Söhne/Oerlikon Geartec, "Closed Loop Bevel Gear Technology".

Brochure "KIMoS, Rechnergestützte Kegelradfertigung", pp. 1-16.

Wahl, Heiko, "Schneller Datenaustausch übers Netz", MaschinenMarkt, No. 25, June 2003, 38-40.

Bauer, Friedrich L., "Entzifferte Geheimnisse—Methoden und Maximen der Kryptologie" Berlin Heidelberg 1995, 153-168.

Presentation of Dr. Roland Dutschk of Klingelnberg Söhne/Oerlikon Geartec Design and Optimization of Spiral Bevel Gears, Apr. 2001.

Diffie, Whitfield and Hellman, Martin E., "New Directions in Cryptography", IEEE Transactions on Information Theory, vol. IT-22, No. 6, 644-654.

Cranor, Lorrie Faith and Cytron, Ron K., "Sensus: A Security-Conscious Electronic Polling System for the Internet", vol. 3, 561-570.

Halsall, Fred, "Data Communications, Computer Networks, and Open Systems"3rd Ed., 1992, 598-599.

Masahiro Kawamitsu, Total Security Solution, Business Communication, vol. 36, No. 8, Japan, Aug. 1, 1999, pp. 104-105.

* cited by examiner

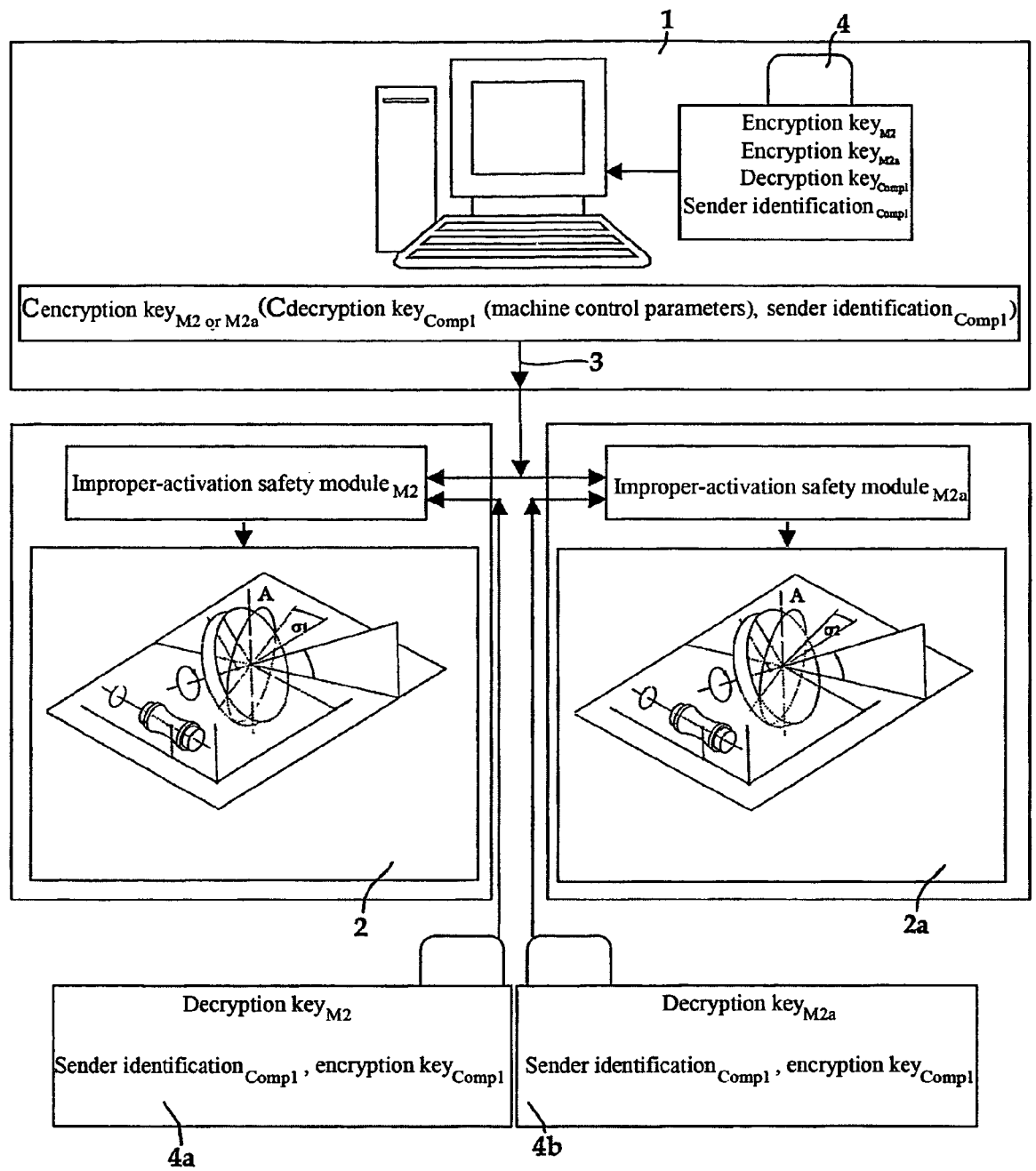

ered for it, in that, instead of the original machine address of the machine that is not available, now the address of the other machine, which although available for these control parameters has not been enabled, is entered—for instance by means of an editor.

METHOD AND DEVICE FOR PREVENTING A CONTROL ERROR OF A MACHINE TOOL

CROSS REFERENCE TO RELATED APPLICATIONS

This application claims the benefit of PCT Application No. PCT/EP2003/011569, filed on Oct. 17, 2003, the disclosures of which are herein incorporated by reference in their entirety.

FIELD OF THE INVENTION

The present invention relates to a machine tool protected against improper activation and an associated method of avoiding improper machine activation by machine control parameters.

BACKGROUND OF THE INVENTION

Against the background of increasingly interlinked production processes and their standardization in the industry, the problem that is nowadays the prime concern in the production of machine tools is that of also incorporating in this process the computer systems that are necessary for activating the machine tools. In this respect, one aim is to provide, to the extent technically possible, standardized machine control systems, offering the user greatest possible uniformity of the machine control parameters for the products from his range of workpieces—for instance when changing an actual machine type or else for improved data storage and archiving.

Such initiatives have already been pursued for some time for various types of machine tools.

For bevel gear cutting machines there are for instance solutions to this in which the relevant machine control parameters of an entire machine family are combined in a standardized data model with all the axes to be activated that come into consideration in the machine family, which then, in individual cases, is replicated on the respective machine actually concerned —to the extent to which this is possible, that is to say the axes activated by the machine control parameters are also actually present.

One problem of these systems is, however, that the standard data model created by them for the machine control parameters also entails great risks for the operational reliability of the machine tools respectively activated with them. While in the case of a non-standard data model there is no risk of using the machine control parameters to activate a machine type which is not suitable for these parameters, because it cannot even read the corresponding format, or at least not process it, this is no longer ruled out in the case of the standardization mentioned above. Rather, here it is the case that all the machine types can read in the machine control parameters in their standard format and also process them for their control; however, here it is not ensured that this processing then always leads to an appropriate working result on the machine. Indeed, more troubling still, it is still possible for machine control parameters which have been generated for one machine type 1 to be incorrectly sent to a machine of type 2, which then processes them and thereby controls its axes in such a way as to cause irreparable damage to the machine itself or even personal injury, for instance as a result of electric cables being severed by cutting tools improperly controlled in this way.

Such improper activation can be avoided for instance by adding to the machine control parameters a machine address, which specifies the machine that can be activated with the aid of the machine control parameters, and by setting up the machines in such a way that they first check from this added machine address whether the machine control parameters are also actually suitable for them. Such a procedure presupposes, however, that the machine control parameters protected in this way are also actually in an unchanged form when they reach the machine from the source from which they originate. This cannot always be ensured, however. Rather, it is the case that, once generated, parameters of this type are easy to change. For instance, it is possible that machine control parameters are generated for a specific workpiece and a specific machine, but this machine is not available at the planned production time. If another machine is provided instead, one which is capable in principle of processing the machine-independent format of the machine control parameters, but for different limit values and under different boundary conditions in terms of safety than those which apply to the machine originally planned for use, there is a great temptation simply to use the machine control parameters for this machine although they are not enabled for it, in that, instead of the original machine address of the machine that is not available, now the address of the other machine, which although available for these control parameters has not been enabled, is entered—for instance by means of an editor.

Experience shows that, in today's production plants, which are under strong pressure to produce results, such a procedure breaching safety functions is not uncommon.

SUMMARY OF THE INVENTION

It is therefore the object of the present invention to provide a machine tool which is protected against improper activation and associated methods of avoiding improper machine activation by machine control parameters which ensure to the greatest extent possible that control parameters once generated for a specific machine are also only used for activating this machine.

This object is achieved according to the invention by a machine tool protected against improper activation which has an open-loop and/or closed-loop control device for the activation of machine functions, preferably machine axes, and means for reading in machine control parameters for the open-loop and/or closed-loop control device from a data carrier or electronic carrier signal, which is characterized in that it has an improper-activation safety module, preferably an improper-activation safety software module, which decodes the machine control parameters again that are intended for the machine tool and are encoded by means of an asymmetric encryption method, using an encryption key which is assigned to the machine tool and provided for the encryption, with the aid of a decryption key which is likewise assigned to the machine tool, is different from the encryption key and is provided for the decryption, and which module enables the machine control parameters for controlling the machine tool only in the case of successful decryption.

Also helping to achieve this object is a data carrier according to the invention or an electronic carrier signal with machine control parameters for reading into the machine tool, the data carrier or the electronic carrier signal having on it machine control parameters for the machine tool which are encoded by means of an asymmetric encryption method with the aid of an encryption key which is assigned to the machine tool and is provided for the encryption, so that the machine tool can decode them again with the aid of a decryption key which is likewise assigned to it, is different from the encryption key and is provided for the decryption, and the data carrier or the electronic carrier signal controls the machine tool by means of these machine control parameters during reading-in or after reading-in after they have been decoded.

Similarly helping to achieve the object according to the invention is a method of avoiding improper machine activation by machine control parameters of a machine tool in which the machine control parameters intended for the machine tool are encoded by means of an asymmetric encryption method with the aid of an encryption key which is assigned to the machine tool and is provided for the encryption, so that the machine tool can decode the machine control parameters again with the aid of a decryption key which is likewise assigned to it, is different from the encryption key and is provided for the decryption.

The aforementioned machine tool according to the invention, the data carrier or carrier signal according to the invention with machine control parameters for reading into the machine tool and also the associated method according to the invention of avoiding improper machine activation by machine control parameters now achieve the effect that only the machine for which the machine control parameters were generated is activated, in that only this machine is capable in the first place of decrypting the data intended for it and encoded with an encryption key assigned to it, and then subsequently processing the said data. For this purpose, a method already known from the prior art (for instance from Bauer, Friedrich L., Entzifferte Geheimnisse—Methoden und Maximen der Kryptologie [deciphered secrets—methods and maxims of cryptology], Berlin Heidelberg 1995, pages 153-168, or Diffie, W. and Hellman, M. E., New Directions in Cryptography, Transactions IEEE Inform. Theory, IT-22, 6 (1976), 644-654 or else U.S. Pat. No. 4,405,829, all texts of which the disclosure content is expressly incorporated here by way of reference), namely a so-called asymmetric encryption method, is used—although here in an extremely unusual way—in which a message for a recipient is encoded by means of an encryption key (also referred to in the literature as a public key), which message can then be decoded again by the said recipient by means of a decryption key which is different from the public key and in the literature is also referred to as a so-called private key. According to the present invention, this method is used, however, in such a way that the encryption key does not serve for encoding, i.e. making a message unreadable, but rather for the secure addressing of the correct recipient. In other words, the encryption key acts here both as a security mechanism against unauthorized manipulations of the machine control parameters encrypted with it and also inherently, by way of the asymmetric encryption method used, as a machine address of the associated machine tool. By contrast with the object of an asymmetric encryption method according to the prior art, here it is not the aim to keep the machine control parameters secret in some way, but only to make certain that the parameters are only used to activate the machine that can also ensure operationally reliable execution of these control instructions. This is also reflected in the use of the encryption and decryption keys. This is so because in the present invention it is precisely the encryption key, referred to in the prior art as public (known as the 'public key', see above), that is the actual 'secret' key, i.e. known only to the authorized system for the generation of machine control parameters; without knowledge of this encryption key, a machine cannot be activated by means of generated machine control parameters. Conversely, the decryption key referred to in the prior art as the 'private key' does not necessarily have to be kept secret according to the present invention. Rather, it can be used publicly, for instance for making the communication traffic between a computer system for generating the machine control parameters and the respective machines transparent, without the aim pursued by the invention of operationally reliable machine activation being put at risk as a result.

If, however, other considerations make it desirable for the decryption key of the machine tool also to be kept secret, it is recommendable to use an embodiment of the machine tool according to the invention in which the latter has a reader, preferably a chip card reader, which is intended for receiving a decryption module, preferably a chip card, which has the decryption key, with the aid of which the improper-activation safety module decodes the encoded machine control parameters, and the decryption module being set up in such a way that only the improper-activation safety module can read out the decryption key from the module, which can easily be achieved for instance by the data that are located in the module, that is also the decryption key itself, in turn being encoded, the improper-activation safety module having the key for the decryption of the module data.

The determination whether a decryption was successful can preferably happen by taking place after the decryption on the basis of finding a machine identification assigned to the machine tool, the associated method according to the invention of avoiding improper machine activation by machine control parameters of a machine tool according to the present invention being designed in such a way that a machine identification assigned to the machine is added to the machine control parameters before the encryption, so that, when it decodes the machine control parameters again with the aid of its assigned private decryption key, the machine tool can determine on the basis of the fact that these contain the machine identification assigned to it that the parameters concerned are machine control data for its activation. The corresponding data carrier or the corresponding electronic carrier signal with machine control parameters for reading into the machine tool is in this case designed in such a way that on the data carrier or the electronic carrier signal there is at least one machine identification included in the encryption and assigned to the machine tool, so that, when it decodes the machine control parameters again with the aid of its assigned private decryption key, the machine tool can determine on the basis of the fact that these contain the machine identification assigned to it that the parameters concerned are machine control data for its activation.

In a particularly preferred embodiment, the machine tool according to the invention, protected against improper activation, is characterized in that the improper-activation safety module enables various functions of the machine tool for control by the machine control parameters in dependence on the decryption key originating from a plurality of decryption keys assigned to the machine tool.

Nowadays it is often the case that, in respect of its physical component parts, one and the same machine is offered on the market in variants which differ both in price and in function. The individual variants thereby often differ only in different control modules, preferably software modules, or even only in the different enablement by the manufacturer of different (software) modules already present in the machine, according to which options the customer is prepared to pay for. The present invention is ideally suited in the embodiment described above for also ensuring this functionality largely with security with respect to manipulations, in that modules, preferably software modules, with a differing functional extent are stored in the machine and are respectively assigned different encryption and decryption keys. The customer acquiring a specific machine variant is then also always supplied at the same time with the encryption key—coded openly, or if desired also in a concealed manner (for instance a chip card as stated above)—, which serves as an inherent machine address of the module corresponding to the extent of performance he has ordered. The machine control parameters encoded by means of this encryption key can then only be decrypted and further processed by this module. All other modules, on the other hand, cannot do anything with the parameters. In practice, this can be realized for instance by all the modules attempting one after the other to decrypt the machine control parameters until finally one (or even none) is successful, it also being possible for this procedure to be optimized by always beginning with the module that was last successful in decryption in all further attempts at decryption, so that processing time is saved as a result, and a new module is sought only in the case of changing the encryption key, serving as it were in this way as an address of a virtual machine—for instance in the event of a so-called upgrade. In this connection, it is to be emphasized that the present invention is particularly suitable for upgrades of this type, in that in such a case the customer wishing to acquire new options for his machine is simply correspondingly provided with new decryption or encryption modules, preferably chip cards, which represents a solution which is decidedly secure with respect to manipulations and cost-effective.

A further preferred embodiment of a machine tool according to the invention, protected against improper activation, is distinguished by the fact that the improper-activation safety module determines successful decryption of the machine control parameters after decryption also on the basis of finding a signature of a unit authorized for activating the machine tool.

The associated method of avoiding improper machine activation by machine control parameters of a machine tool according to the present invention is characterized in that the machine control parameters intended for the machine tool are first encoded by means of a private decryption key, assigned to the sender of the machine control parameters, and are provided with a sender identification of this sender, and, signed by the sender in this way, are only encoded with the aid of the encryption key that is assigned to the machine tool and known for the encryption.

Signature methods are methods which serve for the authentication of a message with regard to it sender. Asymmetric encoding methods can also be used as signature methods whenever the message can be both decoded with the decryption key when it has been encoded with the encryption key and decoded with the encryption key when it has been encoded with the decryption key (cf. also in this respect for instance the texts already incorporated here in the disclosure content by reference, for instance from Bauer, Friedrich L., Entzifferte Geheimnisse—Methoden und Maximen der Kryptologie, Berlin Heidelberg 1995, pages 153-168, in particular pages 155 and 156 therein, or else U.S. Pat. No. 4,405,829). In such a signature method with an encryption key and a decryption key of the sender, the latter can then sign a message in a way which can easily be checked, in that the sender initially encodes the message with his decryption key, then adds a sender identification to this key and encodes the overall message created in this way with the encryption key belonging to the target machine. After decoding, this machine can then initially read the sender identification and determine by means of this—for instance on the basis of a directory, such as a list or a data bank—, which encryption key is assigned to this sender identification. If then—on the basis of the special additional characteristic of this asymmetric encoding system explained at the beginning of this section— this encryption key found in this way is suitable for the decryption of the message, the machine knows that the message actually comes from the sender corresponding to the identification used in the overall message.

In the present case, such a signature method that is already known from the prior art can thus be additionally used not only for checking on the machine tool whether the machine control parameters were actually generated for this machine, but also for determining whether the system which generated the data—that is the sender in the terminology used above—is also actually suitable and authorized to do so, for instance on the basis of a corresponding list. If this is not the case, in this embodiment the machine does not process the corresponding machine control parameters. Such an embodiment consequently offers the possibility of certifying systems for the generation of machine control parameters and enabling them for the activation of machine tools. In this way it is possible to exclude from activation those systems which do not offer sufficient assurance of security.

Also serving here for the operation of the machine tool according to the invention is preferably a data carrier according to the invention or an electronic carrier signal according to the invention with machine control parameters for reading into the machine tool, the data carrier or the electronic carrier signal having on it machine control parameters for the machine tool which are first encoded by means of a private encryption key, assigned to the sender of the machine control parameters, and are provided with a sender identification of this sender, and, signed in this way, are only encoded with the aid of the encryption key that is assigned to the machine tool and known for the encryption.

Also serving for carrying out the present invention is a method of generating machine control parameters for a machine tool which is characterized according to the invention in that it generates a data carrier or an electronic carrier signal with machine control parameters as described above. It goes without saying that this method may also to be realized on a computer system with at least one data processing unit and at least one memory, usually for instance as a computer program, it having the corresponding instructions set up for carrying out the method. Such a computer program may in this case take any form, but in particular also that of a computer program product on a computer-readable medium, such as for instance a floppy disc, CD or DVD, it having computer program coding means, with which, after loading the computer program, a computer is in each case made by the program to carry out the method of generating a data carrier or electronic carrier signal according to the invention. It may, however, also be for instance in the form of a computer program product which has a computer program on an electronic carrier signal, with which, after loading the computer program, a computer is in each case made by the program to carry out the method according to the invention.

In the same way as described above, the method according to the invention may be used to avoid improper machine activation by machine control parameters of a machine tool in all embodiments on a correspondingly set up computer system. It may take the form of a computer program, for instance on a data carrier or an electronic carrier signal, for instance for downloading. A computer system set up in this way for generating machine control parameters for a machine tool according to the invention may in this case also have a reader, preferably a chip card reader, which is intended for receiving an encryption module, preferably a chip card, which has the encryption key, with the aid of which the computer system encodes the machine control parameters, and furthermore an encoding module, preferably an encoding software module, is provided for encoding the machine control parameters, the encryption module being set up in such a way that only the encoding module can read out the encryption key from the module. It should be additionally noted at this point that of course all other further data necessary for the present invention can be stored completely or partly on a module allowing reading out, for instance the decryption module or the encryption module, preferably in such a way that they are secured against unauthorized reading out. All these embodiments which use such modules, preferably chip cards, offer the advantage that they can be configured extremely flexibly with the aid of an external system, without requiring any modification of the software in the respective machine tool or the respective computer system for generating the control parameters.

The different individual elements of the present invention described above, seen in their entirety, can provide a computer control system for avoiding improper machine activation by machine control parameters for a machine tool with a computer system for generating machine control parameters for a machine tool according to the invention or a computer program or computer program product for this, and at least one machine tool according to the invention.

Further details of such a system according to the present invention can be taken from the exemplary embodiments.

BRIEF DESCRIPTION OF THE DRAWINGS

Exemplary embodiments of the present invention, which are to be understood as non-restrictive, are discussed below on the basis of the drawing, in which:

FIG. 1 shows a computer control system according to the invention for avoiding improper machine activation by machine control parameters for a machine tool.

DESCRIPTION OF PREFERRED EMBODIMENTS

FIG. 1 shows a computer control system according to the invention for avoiding improper machine activation by machine control parameters for a machine tool, to be precise with a computer system 1 according to the invention for generating machine control parameters for a machine tool 2, 2a according to the invention with at least one data processing unit and at least one memory, the data processing unit being set up in programming terms in such a way that it generates here in a data network an electronic carrier signal 3 with machine control parameters according to the present invention, and two machine tools 2, 2a according to the invention.

In the present case, the situation is therefore such that the first machine 2 has (along with other axes) a mechanical pivoting axis $\sigma_1$ for the pivoting of the workpiece and the grinding wheel with respect to each other by means of a rotation of the grinding wheel axis or its parallel projection in the horizontal plane A. The second machine 2a likewise has such a pivoting axis $\sigma_2$, but, on account of further mechanical components in the pivoting range of this axis, cannot cover the complete pivoting angle of the pivoting axis $\sigma_1$, even though this second machine 2a can in principle, on account of the same basic construction, in fact still activate the pivoting axis of an entire angular range, which from a certain position, however, then leads to breakage. The present invention now offers the possibility of effectively preventing operation involving such breakage. The machine 2 with the greater pivoting angle has an improper-activation safety software module$_{M2}$, with associated encryption key$_{M2}$ and decryption key$_{M2}$. The second machine 2a with the smaller pivoting angle contains its own improper-activation safety software module$_{M2a}$, with associated encryption key$_{M2a}$ and decryption key$_{M2a}$. The computer system 1, which generates the machine control parameters, then knows which maximum angle is available for activation to the respective machine 2, 2a for the mechanical pivoting axis $\sigma_1$, $\sigma_2$. In order that machine control parameters for the first machine 2 are then not mistakenly used on the other machine 2a, they are encrypted by means of an encryption module C, preferably a software module, by means of the respective encryption key, namely the encryption key$_{M2}$ or else the encryption key$_{M2a}$, as the respective inherent address of the associated machine, this key being read in from a chip card 4 by means of a corresponding reader. In this way it is thus ensured that only the machine 2, 2a addressed by means of this key is also actually activated by the machine control parameters, and so breakage does not occur, since the respective machine 2, 2a can also only read the control parameters addressed to it by means of their respective improper-activation safety software module and the decryption key read in from their own chip card 4a, 4b by means of a reader.

In order that the respective machine 2, 2a can also make certain that the control parameters also actually originate from a source which is capable of ensuring reliable activation of the machine 2, 2a, here the machine control parameters are also signed by means of a signature method using a sender identification. With the aid of an encryption key and a decryption key of the sender, namely with the aid of the keys encryption key$_{Comp1}$ and decryption key$_{Comp1}$, the machine control parameters can be signed by the computer system 1 in a way which can easily be checked, in that it, as the sender, initially encodes the control parameters with its decryption key$_{Comp1}$, then adds the sender identification to this key and encodes the overall message created in this way with the encryption key$_{M2}$ or encryption key$_{M2a}$ belonging to the target machine 2, 2a. After decoding, the respective machine 2, 2a can then initially read the sender identification, here sender identification$_{Comp1}$, and determine by means of this—here on the basis of a directory on the chip card 4a, 4b—, which encryption key is assigned to this sender identification, here encryption key$_{Comp1}$. If then, on the basis of the special additional characteristic of this asymmetric encoding system that is required and used here in the general part of the description (as for instance in the case of the known RSA method, cf. also U.S. Pat. No. 4,405,829), this encryption key found in this way is suitable for the decryption of the message, because it was encrypted by means of the decryption key, the machine 2, 2a knows that the message actually comes from the computer system 1 as the sender corresponding to the identification used in the overall message, sender identification$_{Comp1}$. The fact that this identification is recorded on the chip card 4a, 4b allows the machine to rely on the suitability of the sender for activation.

The invention claimed is:

1. A method of avoiding improper machine activation of a multi-axis machine tool by machine control parameters received by the multi-axis machine tool from a computer system that generates the machine control parameters for the multi-axis machine tool, comprising:

assigning a sender encryption key, a sender decryption key, and a sender identification to said computer system that generates the machine control parameters, said sender encryption key being different from said sender decryption key;

assigning a machine tool encryption key and a machine tool decryption key to said multi-axis machine tool, said machine tool decryption key being different from said machine tool encryption key;

providing a data processing unit and a memory to be read via a reader in said computer system for generating machine control parameters for said multi axis machine tool;

activating the data processing unit and the memory, or an encryption module, of said computer system to generate the machine control parameters for said multi axis machine tool;

encrypting, by the data processing unit or the encryption module, the machine control parameters generated to activate said multi-axis machine tool using said sender decryption key to obtain first-encrypted machine control parameters, adding said sender identification to the first-encrypted machine control parameters;

encrypting the first-encrypted machine control parameters including said added sender identification using said machine tool encryption key to obtain second-encrypted machine control parameters;

providing an improper-activation safety module in said multi-axis machine tool to receive the second-encrypted machine control parameters from the computer system;

when the second-encrypted machine control parameters are received in said multi-axis machine tool, decrypting the second-encrypted machine control parameters using said machine tool decryption key to obtain first-encrypted machine control parameters and the added sender identification using said improper-activation safety module in the multi-axis machine tool, wherein decrypting the second-encrypted machine control parameters in said machine tool with the decryption key verifies that the machine control parameters were actually generated for the machine tool;

authenticating the computer system for generating the machine control parameters for the multi-axis machine tool based on an allowed sender identification and the added sender identification and a suitability of said sender encryption key for further decrypting the first-encrypted machine control parameters in said improper-activation safety module in the multi-axis machine tool, wherein authenticating the computer system for generating the machine control parameters for the multi-axis machine tool verifies that the computer system for generating the machine control parameters for the multi-axis machine tool is actually suitable and authorized to generate the machine control parameters for the multi-axis machine tool; and when the computer system for generating the machine control parameters for the multi-axis machine tool is authenticated, decrypting the first-encrypted machine control parameters using said sender encryption key to obtain the machine control parameters using said improper-activation safety module in the multi-axis machine tool.

2. A method for avoiding improper machine activation of a multi-axis machine tool within a computer control system, the computer control system comprising a multi-axis machine tool with an improper-activation safety module and a computer system for generating asymmetrically encrypted machine control parameters for the multi-axis machine tool and sending the encrypted machine control parameters to the multi-axis machine tool via a data carrier or an electronic carrier signal, the method comprising:

generating machine control parameters to activate said multi-axis machine tool;

retrieving a sender decryption key, a sender identification, a machine tool encryption key associated with the multi-axis machine tool having an improper-activation safety module;

encrypting the machine control parameters using said sender decryption key to obtain first-encrypted machine control parameters, adding said sender identification to the first-encrypted machine control parameters, encrypting the first-encrypted machine control parameters including said added sender identification using said machine tool encryption key to obtain second-encrypted machine control parameters, and sending the second-encrypted machine control parameters via the data carrier or the electronic carrier signal to the multi-axis machine tool for validating and activating the multi-axis machine tool, each aforesaid step performed by the computer system for generating the machine control parameters for the multi-axis machine tool.

3. A method for avoiding improper machine activation of a multi-axis machine tool within a computer control system, the computer control system comprising a multi-axis machine tool with an improper-activation safety module and a computer system for generating asymmetrically encrypted machine control parameters for the multi-axis machine tool and sending the encrypted machine control parameters to the multi-axis machine tool via a data carrier or an electronic carrier signal, where said encrypted machine control parameters are generated by the computer system for generating encrypted machine control parameters for the multi-axis machine tool by encrypting the machine control parameters using a sender decryption key to obtain first-encrypted machine control parameters, adding a sender identification to the first-encrypted machine control parameters, and further encrypting the first-encrypted machine control parameters including the added sender identification with a machine tool encryption key to obtain second-encrypted machine control parameters, the method comprising:

receiving in the multi-axis machine tool the second-encrypted machine control parameters from the computer system for generating encrypted machine control parameters for the multi-axis machine tool via the data carrier or the electronic carrier signal;

retrieving a sender encryption key, an allowed sender identification, and a machine tool decryption key associated with the multi-axis machine tool having an improper-activation safety module;

decrypting the second-encrypted machine control parameters using said machine tool decryption key to obtain the first-encrypted machine control parameters and the added sender identification;

determining if the computer system for generating the machine control parameters for the multi-axis machine tool is authorized to generate the machine control parameters for the multi-axis machine tool based on the allowed sender identification and the added sender identification; and in response to the determining that the computer system is authorized to generate the machine control parameters, decrypting the first-encrypted machine control parameters using the sender encryption key to obtain the machine control parameters;

each of the aforesaid steps performed by the safety module of the multi-axis machine tool.

* * * * *